US012240224B2

(12) United States Patent
Kondo

(10) Patent No.: US 12,240,224 B2
(45) Date of Patent: Mar. 4, 2025

(54) PRINTING APPARATUS, METHOD FOR CONTROLLING THE SAME, AND MEDIUM

(71) Applicant: BROTHER KOGYO KABUSHIKI KAISHA, Nagoya (JP)

(72) Inventor: Hirofumi Kondo, Mie (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 137 days.

(21) Appl. No.: 18/187,012

(22) Filed: Mar. 21, 2023

(65) Prior Publication Data

US 2023/0311538 A1 Oct. 5, 2023

(30) Foreign Application Priority Data

Apr. 1, 2022 (JP) ................................. 2022-061458

(51) Int. Cl.
*B41J 2/00* (2006.01)
*B41J 11/00* (2006.01)

(52) U.S. Cl.
CPC .... *B41J 11/00212* (2021.01); *B41J 11/00214* (2021.01); *B41J 11/00216* (2021.01)

(58) Field of Classification Search
CPC ............ B41J 11/00212; B41J 11/00214; B41J 11/00216
See application file for complete search history.

(56) References Cited

U.S. PATENT DOCUMENTS 11,738,572 B2 * 8/2023 Nakagawa ......... B41J 11/00218 347/102
2022/0281220 A1 * 9/2022 Kondo ..................... B41J 29/13

FOREIGN PATENT DOCUMENTS

JP 2006-021435 A 1/2006
JP 7075315 B2 * 5/2022 ..... H03K 19/017527
JP 7083743 B2 * 6/2022 ........... B29C 64/135

* cited by examiner

*Primary Examiner* — Sharon Polk
(74) *Attorney, Agent, or Firm* — MERCHANT & GOULD P.C.

(57) ABSTRACT

There is provided a printing apparatus including: a line head including a plurality of nozzles and a discharging surface in which the plurality of nozzles is opened, the line head being configured to discharge a photo-curing ink from the plurality of nozzles to a printing medium; a light irradiator configured to irradiate the photo-curing ink on the printing medium with a light; an optical sensor configured to measure a distance between the printing medium and the discharging surface, and a controller configured to cause the light irradiator to execute an irradiating operation of irradiating the photo-curing ink on the printing medium with the light at a first timing, and cause the optical sensor to execute a distance measuring operation of measuring the distance between the printing medium and the discharging surface at a second timing different from the first timing.

16 Claims, 7 Drawing Sheets

PRINTING APPARATUS, METHOD FOR CONTROLLING THE SAME, AND MEDIUM

REFERENCE TO RELATED APPLICATIONS

This application claims priority from Japanese Patent Application No. 2022-061458 filed on Apr. 1, 2022. The entire content of the priority application is incorporated herein by reference.

BACKGROUND ART

As a conventional printing apparatus, for example, an image recording apparatus including recording part configured to record an image onto a recording medium with an ink, an ultraviolet ray (UV ray) irradiating part configured to irradiate the image recorded on the recording medium with the ultraviolet ray (or emit the ultraviolet ray to the image recorded on the recording medium), and a first measuring unit part configured to measure a irradiating distance between the recording medium and the ultraviolet ray irradiating part. In the image recording apparatus, the ultraviolet ray irradiating part emits the ultraviolet ray in a state that the ultraviolet ray irradiating part is moved such that the irradiating distance is kept constant, while measuring the irradiating distance by the first measuring part.

DESCRIPTION

In the image recording apparatus described above, the ultraviolet ray irradiating part emits the ultraviolet ray while measuring the irradiating distance with the first measuring part. Depending on a shape of the recording medium, a light emitted from the ultraviolet ray irradiating part may be reflected by the recording medium and then enter into the first measuring part. At that time, in a case that the first measuring part is an optical sensor, the reflected light is detected as noise of the measurement by the first measuring part, and results in deterioration of measurement accuracy of the first measuring part. Meanwhile, in a case that the first measuring part is arranged distanced from the ultraviolet ray irradiating part so that the reflected light does not enter into the first measuring part, the image recording apparatus will be upsized.

In view of the above situation, an object of a present disclosure is to provide a printing apparatus, a method for controlling a printing apparatus, and a medium each capable of reducing deterioration, due to a reflected light, of measurement accuracy of a distance, while suppressing upsizing of the apparatus.

According to a first aspect of the present disclosure, there is provided a printing apparatus including: a line head including a plurality of nozzles and a discharging surface in which the plurality of nozzles is opened, the line head being configured to discharge a photo-curing ink from the plurality of nozzles to a printing medium; a light irradiator configured to irradiate the photo-curing ink on the printing medium with a light; an optical sensor configured to measure a distance between the printing medium and the discharging surface, and a controller configured to cause the light irradiator to execute an irradiating operation of irradiating the photo-curing ink on the printing medium with the light at a first timing, and cause the optical sensor to execute a distance measuring operation of measuring the distance between the printing medium and the discharging surface at a second timing different from the first timing.

According to a second aspect of the present disclosure, there is provided a method for controlling a printing apparatus. The printing apparatus includes: a line head including a plurality of nozzles and a discharging surface in which the plurality of nozzles is opened, the line head being configured to discharge a photo-curing ink from the plurality of nozzles to a printing medium; a light irradiator configured to irradiate the photo-curing ink on the printing medium with a light; and an optical sensor configured to measure a distance between the printing medium and the discharging surface. The method includes: causing the light irradiator to execute an irradiating operation of irradiating the photo-curing ink on the printing medium with the light at a first timing; and causing the optical sensor to execute a distance measuring operation of measuring the distance between the printing medium and the discharging surface, at a second timing different from the first timing.

According to a third aspect of the present disclosure, there is provided a non-transitory and computer-readable medium storing a program which is executable by a controller of a printing apparatus. The printing apparatus includes: a line head including a plurality of nozzles and a discharging surface in which the plurality of nozzles is opened, the line head being configured to discharge a photo-curing ink from the plurality of nozzles to a printing medium; a light irradiator configured to irradiate the photo-curing ink on the printing medium with a light; an optical sensor configured to measure a distance between the printing medium and the discharging surface, and a controller. The program is configured to cause the controller to: cause the light irradiator to execute an irradiating operation of irradiating the photo-curing ink on the printing medium with the light at a first timing; and cause the optical sensor to execute a distance measuring operation of measuring the distance between the printing medium and the discharging surface, at a second timing different from the first timing.

According to a present disclosure, it is realized an effect of providing a printing apparatus, a method for controlling a printing apparatus, and a medium each capable of reducing deterioration, due to a reflected light, of measurement accuracy of a distance, while suppressing upsizing of the apparatus.

Above object, other object(s), feature(s), and advantage(s) of the present disclosure will be clarified by detailed description and attached drawings of a following embodiment.

In the following, an embodiment of the present disclosure will be explained concretely, with reference to the drawings. Note that, in the following, same reference signs are used for same elements or corresponding elements throughout all drawings, and redundant explanation will be omitted.

EMBODIMENT

Configuration of a Printing Apparatus

Figure 1:
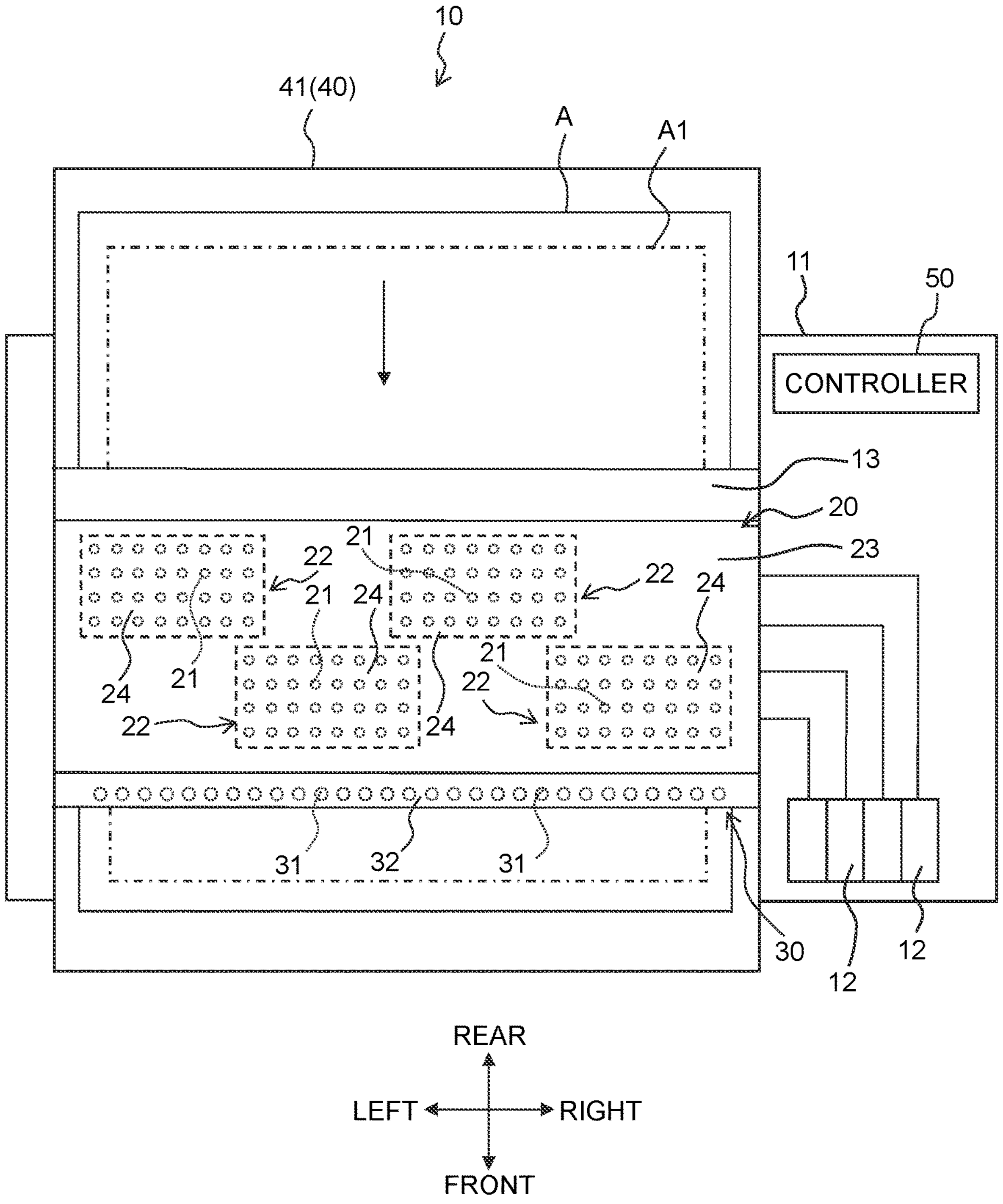
FIG. 1 is a schematic view seeing a printing apparatus from above.

As depicted in FIG. 1, a printing apparatus 10 according to an embodiment of the present disclosure is, for example, an inkjet printer configured to print an image by discharging (ejecting) an ink from nozzles 21 of a line head 20 to a printing medium A and by irradiating the printing medium A with a light from a light irradiating part (light irradiator) 30. The ink is a photo-curing ink. The ink may be, for example, an ink cured by light such as ultraviolet ray (UV ray), infrared ray (IR ray) etc.

The printing medium A has, for example, a sheet shape (such as, a fabric, a textile, a cloth, a paper, and the like), a three-dimensional shape (such as, a ball, a mug, and the like). The printing apparatus 10 is, for example, a 3D printer (three-dimensional printer), and the printing apparatus 10 being 3D printer may manufacture an object (molded or shaped object) by making a shape of the object with the ink discharged from the line head 20 and by curing the shaped object with the irradiation of the light from the light irradiating part 30. In this case, a printing medium A is the object being manufactured. Further, the printing apparatus 10 may print an image onto the object by discharging the ink to the manufactured object from the line head 20 and by irradiating the ink with the light from the light irradiating part 30. In this case, a printing medium A is the manufactured object.

The printing apparatus 10 includes, the line head 20, the light irradiating part 30, a conveying device (conveyor) 40, a casing 11, tanks 12, a sensor 13, and a controller 50. Note that, a first direction in which the conveying device 40 conveys the printing medium A is referred to as a front-rear direction. A direction which crosses (for example, being orthogonal to) the front-rear direction and in which the plurality of nozzles 21 is arranged is referred to as a left-right direction. Further, a direction crossing (for example, orthogonal to) the left-right direction as well as the front-rear direction is referred to as an up-down direction. However, an arrangement of the printing apparatus 10 is not limited thereto.

Figure 2:
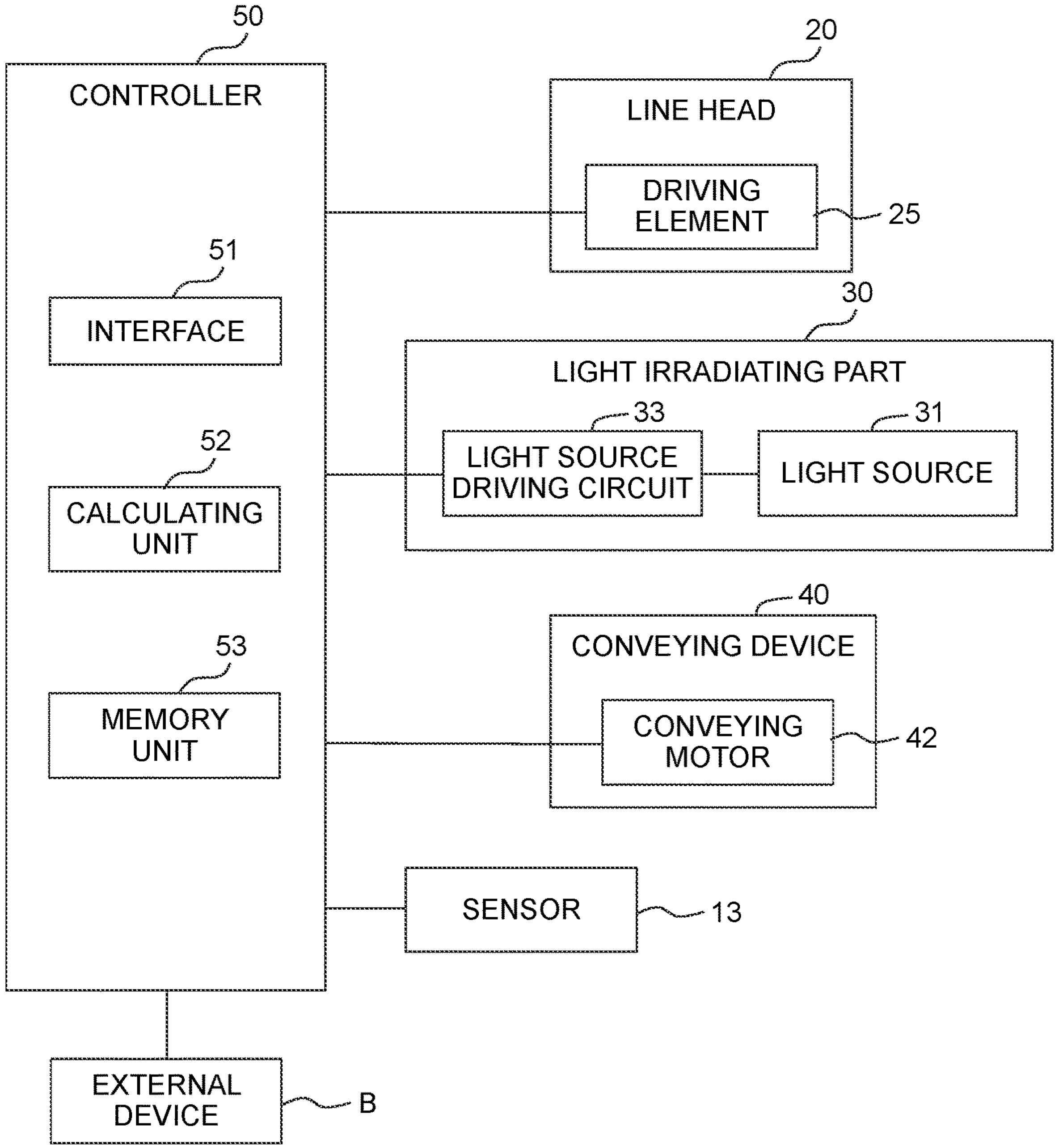
FIG. 2 is a functional block view depicting a configuration of the printing apparatus of FIG. 1.

The conveying device 40 has a platen 41, conveying rail(s), an endless belt, and a conveying motor 42 (FIG. 2). The platen 41 has a flat upper surface. The platen 41 defines a discharging distance by supporting the printing medium A mounted on the flat upper surface, the discharging distance being a distance in the up-down direction between the printing medium A and the line head 20. The conveying rail extends in the front-rear direction and supports the platen 41. The endless belt is arranged along the conveying rail, connected to the platen 41, and connected to the conveying motor 42 via pulley(s). In a case that the conveying motor 42 is driven, the endless belt rotates so as to move the platen 41 in the front-rear direction. Consequently, the printing medium A arranged on the platen 41 is conveyed in the front-rear direction.

Each of the tanks 12 is a container configured to store the ink. The number of tanks 12 is same as the number of kinds (types) of inks. Each of the tanks 12 communicates with the line head 20 via a piping such as a tube, and is configured to supply the ink to corresponding nozzle(s) 21 of the line head 20. The line head 20, the light irradiating part 30, the conveying device 40, the tanks 12, the sensor 13, and the controller 50 are accommodated inside the casing 11. However, one or some of the line head 20, the light irradiating part 30, the conveying device 40, the tanks 12, the sensor 13, and the controller 50 may be arranged outside the casing 11. For example, the casing 11 has a front opening and a rear opening. In such a case, the platen 41 may protrude frontward with respect to the casing 11 via the front opening, and may protrude rearward with respect to the casing 11 via the rear opening, in a case that the platen 41 is moved in the front-rear direction.

The line head 20 includes, for example, a plurality of chips 22, a supporting base 23, and driving elements 25 (FIG. 2). The supporting base 23 has, for example, a rectangular parallelopiped shape, supports the plurality of chips 22, and is fixed to the casing 11. Each of the chips 22 has, for example, a rectangular parallelopiped shape, and is provided with the nozzles 21. Each of the nozzles 21 is an opening provided in a discharging surface 24 being a lower surface of the chip 22. The nozzles 21 are arranged in the chip 22 at equal intervals in the left-right direction so as to configure nozzle rows. Four nozzle rows (that is, nozzle rows as much as the number of kinds of inks) are provided in each of the chips 22, for example. The chips 22 are arranged in the left-right direction and the front-rear direction in a staggered (zig-zag) manner so that nozzles 21 of the nozzle rows are arranged over a range wider than a printable area A1 of the printing medium A in the left-right direction.

The driving elements 25 are each a piezoelectric element, a heating element, or electrostatic actuator or the like, and are each provided corresponding to the nozzle 21. Each of the driving elements 25 drives such that a pressure for discharging the ink from the nozzle 21 is applied to the ink in the line head 20.

The light irradiating part 30 is arranged downstream of the line head 20 in a conveying direction of the printing medium A during a printing process. For example, in a case that printing is performed by discharging the ink from the line head 20 to the printing medium A while conveying the printing medium A frontward, the light irradiating part 30 is arranged in front of the line head 20. With such an arrangement, it is possible to irradiate the ink which has been discharged from the line head 20 and landed on the printing medium A with the light from the light irradiating part 30.

The light irradiating part 30 includes a plurality of light sources 31, and a circuit board 32 on which the plurality of light sources 31 is mounted. The circuit board 32 is made of, for example, an insulating material, and has a rectangular flat plate shape. The plurality of light sources 31 is mounted on a lower surface of the circuit board 32. Each of the light sources 31 is, for example, a light emitting element such as LED, and is configured to emit a light (for example, an ultraviolet ray or an infrared ray) having a function of curing the ink on the printing medium A discharged from the nozzles 21. The light sources 31 are arranged such that one light source 31 is positioned in the front-rear direction and a plurality of light sources 31 is arranged as a row at equal intervals in the left-right direction, so as to form a light source row. The light source row extends over a range wider than the printing area A1 of the printing medium A in the left-right direction.

The sensor (optical sensor) 13 is an optical ranging sensor configured to measure a distance in the up-down direction from the sensor 13 to the printing medium A. The sensor 13 outputs a measured distance to the controller 50. The sensor 13 includes a light emitting element such as a light-emitting diode (LED), a light receiving element such as a photo diode, and a processing part such as a processor. In the sensor 13, the processing part measures the distance based on light emitting data of the light emitting element, and light receiving data of the light receiving element. The discharging surface 24 of the line head 20 is arranged at a predetermined position. Thus, the sensor 13 functions as a sensor for measuring a discharging distance based on the measured distance and the predetermined position (arrangement) of the discharging surface 24, the discharging distance being a distance between the discharging surface 24 and the printing medium A. Note that the controller 50 may obtain or calculate the discharging distance between the discharging surface 24 and the printing medium A based on the distance measured by the sensor 13 and the predetermined position (arrangement) of the discharging surface 24.

As an example, the sensor 13 is a three-dimensional (3D) scanner. The sensor 13 being the 3D scanner obtains a three-dimensional coordinate of the upper surface of the printing medium A arranged on the upper surface of the platen 41, in accordance with a system, such as pattern light projection system, laser ray system, and the like. The 3D scanner functions as a sensor for measuring the discharging distance based on the three-dimensional coordinate and the predetermined position (arrangement) of the discharging surface 24. By using the 3D scanner as the sensor 13, discharging distances corresponding to wide area of the printing medium A can be measured by single measuring operation.

Controller

The controller 50 is a computer, for example. As depicted in FIG. 2, the controller 50 includes an interface 51, a calculating unit 52, and a memory unit 53. The interface 51 receives various data such as image data from an external device B such as a computer, a camera, a communication network, a storage medium, a display, and a printer. The image data is such as raster data indicating an image to be printed onto the printing medium A and the like. Note that the controller 50 may be configured by single device, or may be configured by multiple devices arranged dispersed manner and organized to cooperate for executing operations of the printing apparatus 10.

The memory unit 53 is a memory to which the calculating unit 52 can access. The memory unit 53 is configured by RAM, ROM and the like. The RAM stores various data such as image data temporarily. The ROM stores a computer program for executing various data processing, and predetermined data. Note that the program may be stored in a storage medium which is an external storage medium different from the memory unit 53 and to which the calculating unit 52 can access, such as for example a CD-ROM and the like.

The calculating unit 52 is configured by a circuit and the like, which is at least one of a processor such as a CPU and the like, and an integrated circuit such as ASIC, and the like. The calculating unit 52 controls each part of the printing apparatus 10 so as to execute a printing process by executing the program stored in the ROM.

The controller 50 such as above is connected to the sensor 13. The controller 50 is connected to the driving elements 25 of the line head 20, and controls the driving of each of the driving elements 25. By doing so, discharging timing, discharging velocity, discharging amount, and the like of the discharging of the ink from the nozzle 21 responding to the driving of each of the driving elements 25 is controlled. The controller 50 is connected to the light source 31 via the light source driving circuit 33, and controls switching on and switching off of the light source 31. The controller 50 is connected to the conveying motor 42 and controls driving of the conveying motor 42. By doing so, conveying, stopping, a conveying direction and the like of the printing medium A responding to the driving of the conveying motor 42 is controlled.

Printing Process

The controller 50 obtains image data from the external device B and executes a printing process based on the image data. Here, the controller 50 controls the conveying motor 42 so as to execute the conveying operation of conveying the printing medium A frontward. The controller 50 causes the sensor 13 to execute the measuring operation with respect to the printing medium A being moved frontward so as to measure the discharging distance between the discharging surface 24 of the line head 20 and the printing medium A with the sensor 13. Further, the controller 50 causes the line head 20 in front of the sensor 13 to execute the discharging operation with respect to the printing medium A which is moved frontward and to which the distance measurement has been performed by the sensor 13. In the discharging operation, the controller 50 controls the driving elements 25 based on the discharging distance, and cause the ink to be discharged from the nozzles 21 of the line head 20.

For example, the controller 50 corrects a driving timing of the driving element 25 depending on the discharging distance. By deviating or shifting the driving timing from a timing based on the image data by an amount depending on the discharging distance, the discharging timing of the discharging of the ink from the nozzle 21 due to the driving of the driving element 25 changes by an amount corresponding to the discharging distance. By such change of the discharging timing, a landing position of the ink onto the printing medium A is adjusted depending on the discharging distance.

Further, the controller 50 corrects a driving voltage applied to the driving element 25 depending on the discharging distance. By deviating or shifting the driving voltage from a voltage based on the image data by an amount depending on the discharging distance, the driving amount of the driving element 25 changes by an amount depending on the discharging distance. Thus, the discharging velocity of the ink discharged from the nozzle 21 is changed due to the change of the driving amount of the driving element 25, and consequently, the landing position of the ink onto the printing medium A is adjusted depending on the discharging distance.

As described above, deviation of a landing position of the ink due to a three-dimensional shape of the printing medium A is reduced even if the discharging distance is changed depending on the three-dimensional shape of the printing medium A, because the landing position of the ink is adjusted based on the discharging distance. Note that, the driving timing based on the image data and the driving voltage based on the image data are a timing and a voltage, respectively, in a case that the discharging distance is a predetermined distance, for example, 15 mm.

Further, the controller 50 cause the light irradiating part 30 in front of the line head 20 to execute the irradiating operation with respect to the printing medium A to which the ink is discharged from the line head 20 and which is moved frontward. In the irradiating operation, the controller 50 controls the light sources 31 so as to irradiate the printing medium A with the light from the light irradiating part 30. By doing so, the ink on the printing medium A is cured by receiving the light, and is fixed to the printing medium A. The controller 50 proceeds the printing process by printing the image onto the printing area A1 of the printing medium A with the ink according to the procedure described above.

As described above, in the printing apparatus 10 provided with the line head 20, the measuring operation by the sensor 13 and the irradiating operation by the light irradiating part 30 are performed. Further, the sensor 13 and the light irradiating part 30 are both housed in the same (single) casing 11. Thus, the light emitted from the light irradiating part 30 and is reflected by the printing medium A is likely to enter into the sensor 13, and measuring accuracy of the sensor 13 will be deteriorated by the light (incident light) entered into the sensor 13. In view of such situation, the controller 50 causes the light irradiating part 30 to execute the irradiating operation of the light and causes the sensor 13 to execute the measuring operation of the discharging distance, at timings different from each other. In other words, the controller 50 causes the light irradiating part 30 to execute the irradiating operation of the light at a first timing, and causes the sensor 13 to execute the measuring operation of the discharging distance at a second timing different from the first timing.

Figure 3:
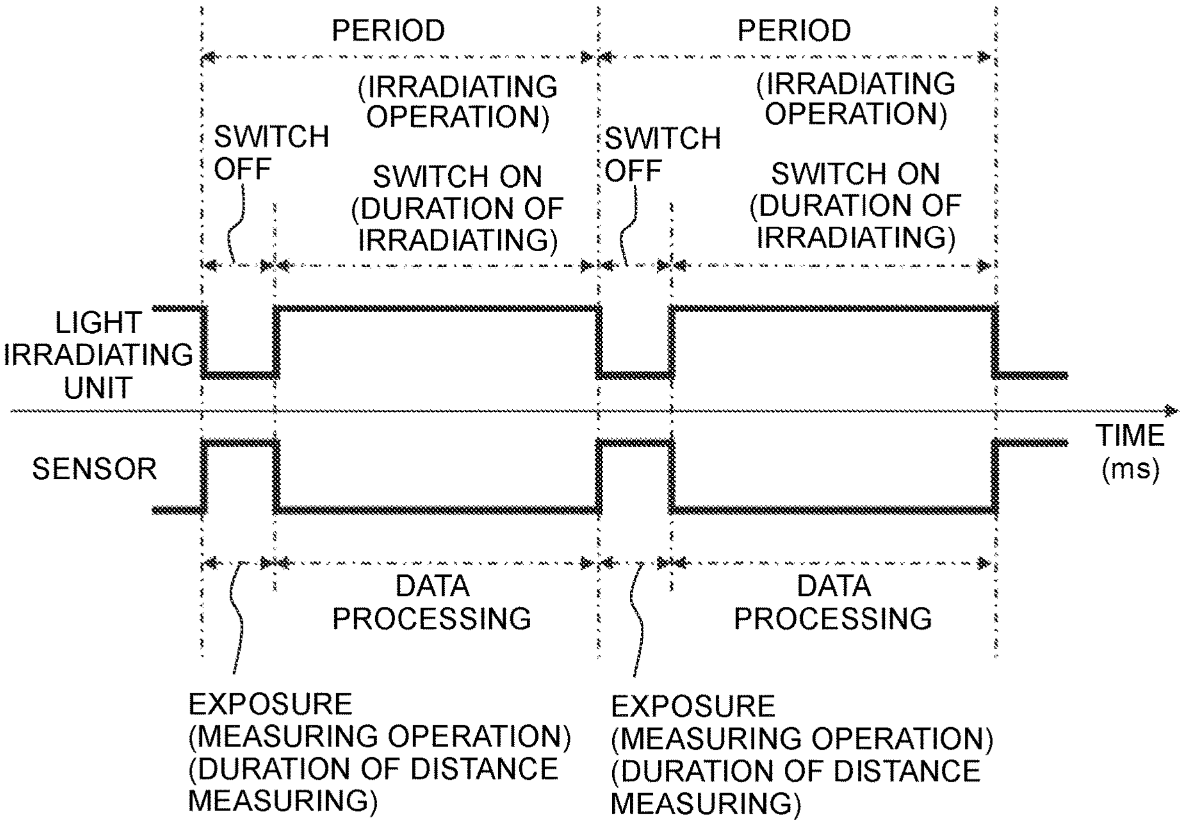
FIG. 3 is timing chart of an irradiating operation and a measuring operation.

As depicted in FIG. 3, the controller 50 causes the irradiating operation and the measuring operation to be executed alternately and periodically. One cycle is, for example, a time period as long as a time period obtained by dividing an irradiating width in the front-rear direction of the light from the light irradiating part 30 by a conveying velocity of the printing medium A. The irradiating range of the light irradiating part 30 is predetermined based on an irradiation angle, illuminance, the irradiating distance between the light source 31 and the printing medium A, and the like. The conveying velocity of the printing medium A is predetermined to be, for example, 70 m/min. Note that, a time interval of approximately 1 to 5 [msec] may be provided between the measuring operation of the sensor 13 and the irradiating operation of the irradiating part 30 so that the measuring operation and the irradiating operation do not interfere with each other.

Here, the light irradiating part 30 performs switching on of the light sources 31 and switching off of the light sources 31 alternately, provided that one cycle is from the switching off of the light sources 31 to the next switching off of the light sources 31 performed after one time of switching on of the light sources 31. The irradiating part 30 executes the irradiating operation by switching on of the light sources 31 and irradiates the printing medium A with the light. The light irradiating part 30 does not execute the irradiating operation during a period in which the light sources 31 are switched off.

Further, the sensor 13 repeats an exposure and a data processing alternately, provided that one cycle is from a beginning of the exposure to a beginning of the next exposure after one time of stopping of the exposure. The sensor 13 executes the measuring operation by the exposure, that is, irradiates the printing medium A with the light from the light emitting element, receives the reflected light from the printing medium A with the light receiving element, and optically obtains or imports data relating to a shape of the printing medium A. Then, in the data processing, the sensor 13 converts optical data obtained by the exposure to a three-dimensional coordinate, without executing the measuring operation. Note that a period in which the sensor performs the data processing is not included in the measuring operation of the sensor 13.

In the one cycle, during a time period in which the light sources 31 are switched off, the sensor 13 performs the measuring operation being the exposure. As described above, in a case (period) that the sensor 13 receives the reflected light, the light irradiating part 30 does not emit the light, and therefore, the light emitted from the light irradiating part 30 and reflected by the printing medium A does not enter the sensor 13. Thus, it is possible to reduce deterioration of measurement accuracy of the discharging distance due to the light from the light irradiating part 30, without widening a distance between the light irradiating part 30 and the sensor 13.

In the cycle, during a time period in which the irradiating operation is performed with the light sources 31 being switched on, the sensor 13 performs the data processing without performing the exposure. As described above, by using the time period in which the irradiating operation is performed as a time for the data processing, it is possible to make the time (duration) for irradiating operation longer, and to reduce un-curing of the ink that may be caused if the light irradiating amount is not sufficient.

A duration of irradiating by the irradiating operation in one cycle is longer than a duration of measuring of the discharging distance by the measuring operation in one cycle, and is, for example, not less than five times as longer as the duration of measuring. For example, in the one cycle, the duration of the measuring operation is not less than 10 [ms] and less than 20 [ms], and the duration of the irradiating operation is not less than 50 [ms] and less than 60 [ms]. Thus, it is possible to reduce un-curing of the ink that may be caused by shortage of the light irradiating amount.

Figure 4A:
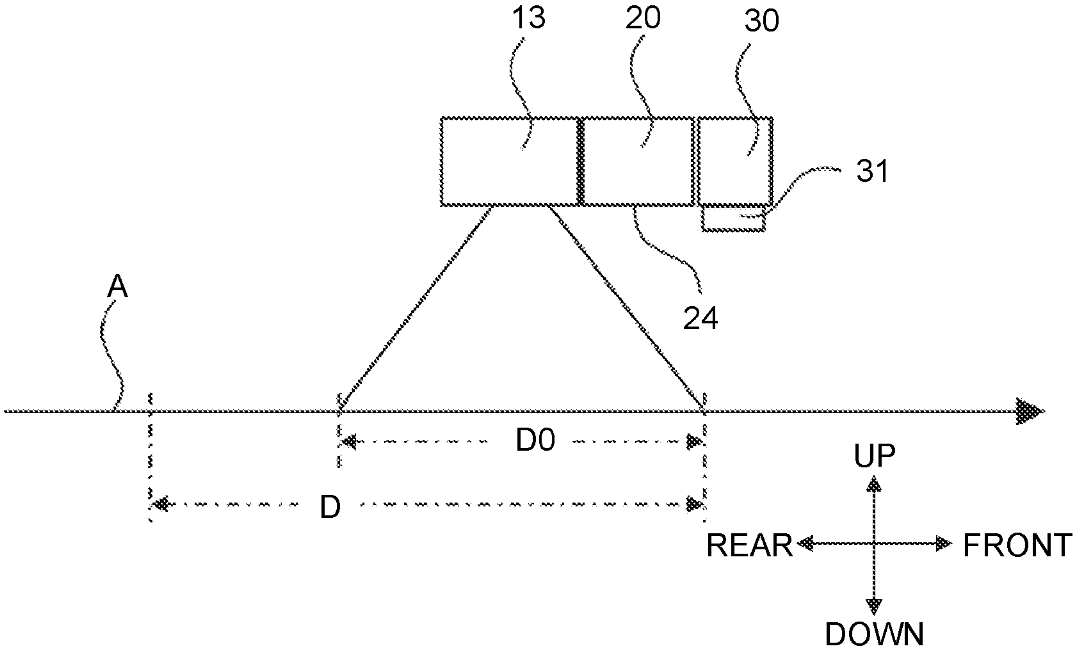
FIG. 4A is a view depicting a measurable range D0 and a cycle measuring range D of a sensor.

The printing medium A is moved during a period in which the measuring operation by the sensor 13 is performed. Therefore, as depicted in FIG. 4A, a cycle measuring range D being a range for which the sensor 13 measures the discharging distance to the printing medium A in one cycle is obtained based on a measurable range D0 of the sensor 13, a duration of the measuring operation of the sensor 13, and a moving velocity of the printing medium A. The moving velocity of the printing medium A is predetermined. The measurable range D0 of the sensor 13 is a range for which the sensor 13 can measure the discharging distance to the printing medium A without moving the sensor 13 and the printing medium A, and is predetermined based on an angle view of the sensor 13 and fixed position of the sensor 13. The duration of the measuring operation is predetermined such that the cycle measuring range D of the measuring operation of the present cycle and the cycle measuring range D of the measuring operation of the next cycle are overlapped or adjacent to each other.

Figure 4B:
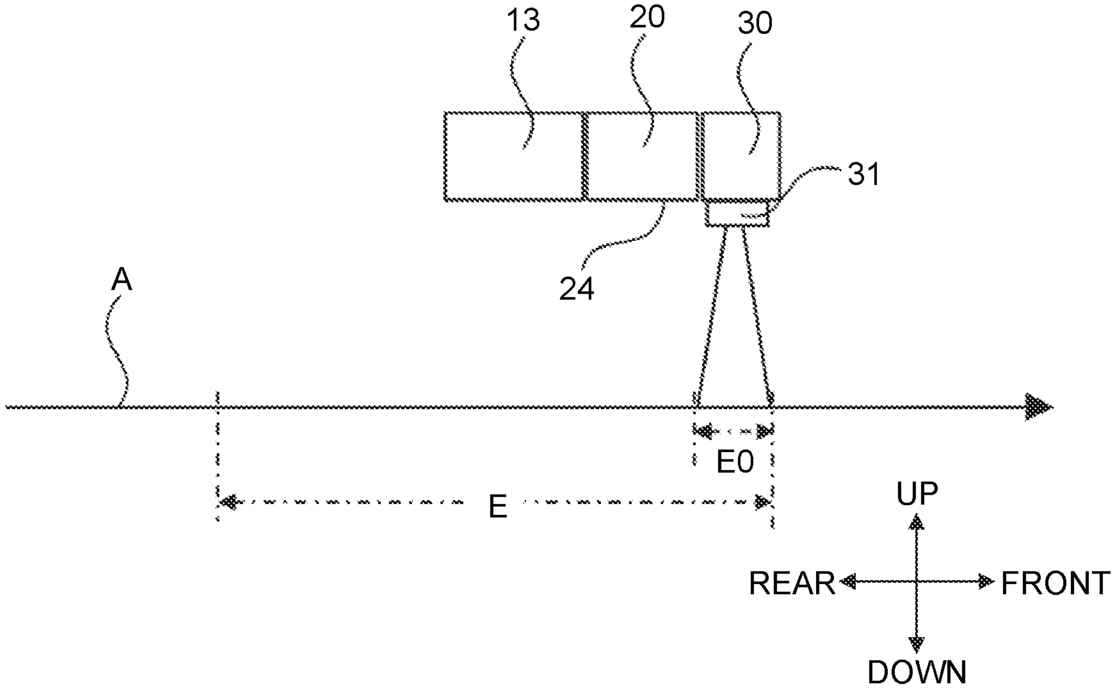
FIG. 4B is a view depicting an irradiable range E0 and a cycle irradiating range E of the light irradiating part.

The printing medium A is moved during a period in which the light irradiating part 30 performs the irradiating operation. Therefore, as depicted in FIG. 4B, a cycle irradiating range E being a range for which the light irradiating part 30 irradiate the printing medium A with the light in one cycle is obtained based on the irradiable range E0 by the light irradiating part 30, a duration of the irradiating operation of the light irradiating part 30, and a moving velocity of the printing medium A. The irradiable range E0 of the light irradiating part 30 is a range for which the light irradiating part 30 can irradiate the printing medium A with the light without moving the light irradiating part 30 and the printing medium A, and is predetermined based on an irradiating angle and an irradiating intensity of the light irradiating part 30. The duration of the irradiating operation of the light irradiating part 30 is predetermined such that the cycle irradiating range E of the irradiating operation of the present cycle and the cycle irradiating range E of the irradiating operation of the next cycle are overlapped or adjacent to each other.

The measurable range D0 of the discharging distance with respect to the printing medium A by the measuring operation of the sensor 13 is wider than the irradiable range E0 of the light with respect to the printing medium A by the irradiating operation of the light irradiating part 30. Thus, a duration of irradiating (a duration of a period in which the light source 31 is switched on) of the light irradiating part 30 in one cycle can be made longer than a duration of measuring (a duration of a period in which the exposure is performed) of the sensor 13 in one cycle. The discharge distance of the printing medium A can be measured while reducing un-curing of the ink due to insufficient light irradiating amount.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification

Figure 6:
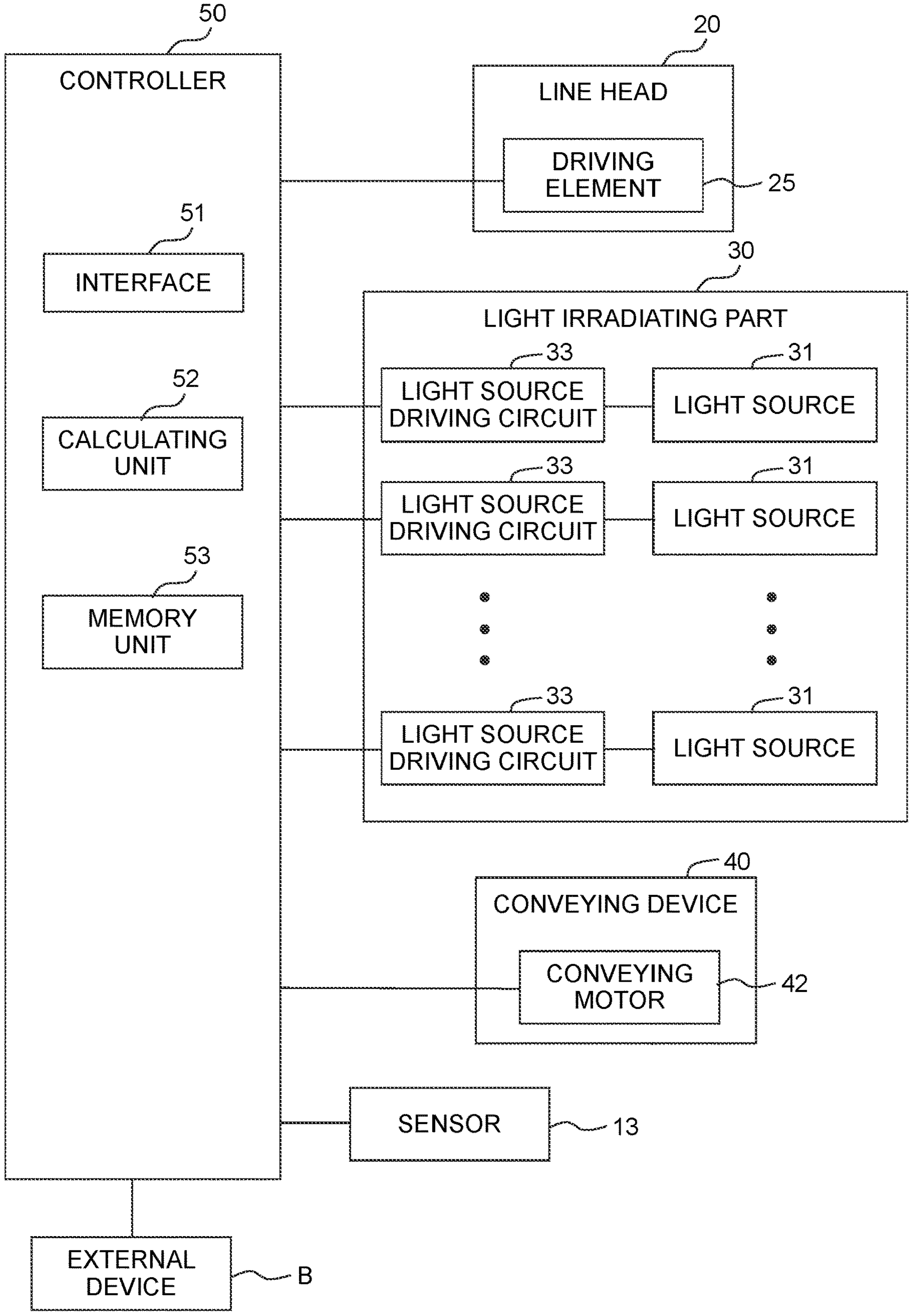
FIG. 6 is a functional block view depicting a configuration of the printing apparatus of FIG. 5.

As depicted in FIG. 6, a printing apparatus 10 according to a modification differs from the embodiment described above in that the light irradiating part 30 includes a plurality of light sources 31, and light source driving circuits 33 being a plurality of driving circuits configured to drive light sources 31, respectively. Here, the controller 50 may switches on and switches of the plurality of light sources 31 arranged in the front-rear direction, such that an amount of variation (dispersion) of a total light amount (amount of light) of the light, from the light irradiating part 30, with which each part on the printing medium A is irradiated is not more than a predetermined amount over (across) the each part on the printing medium A.

Figure 5:
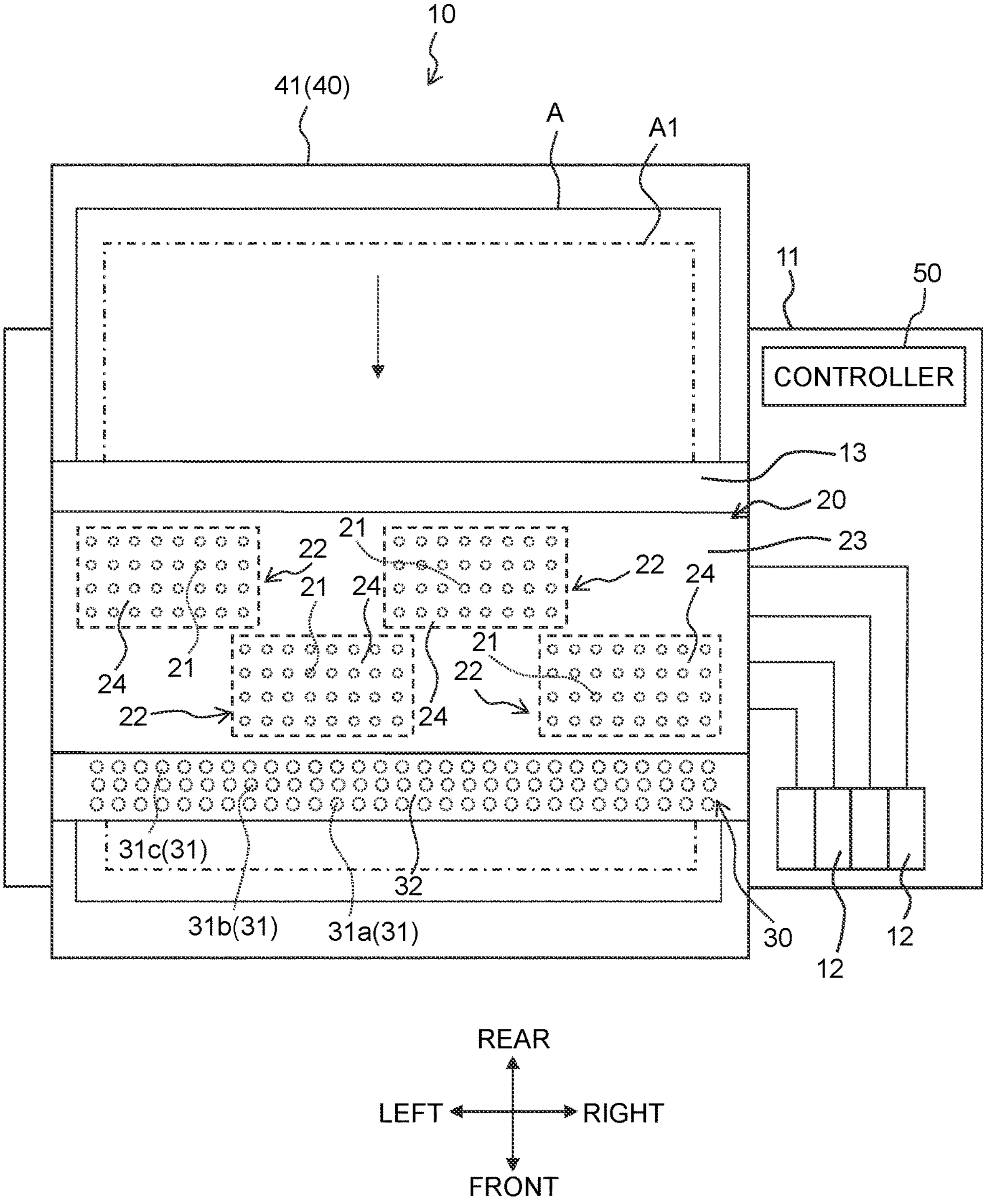
FIG. 5 is a schematic view seeing a printing apparatus from above.

Specifically, as depicted in FIG. 5, the plurality of light sources 31 configure light source rows each arranged or aligned in the left-right direction, and the light irradiating part 30 has a plurality of (for example, three pieces of) light source rows arranged in the front-rear direction. As depicted in FIG. 6, the number of the light source driving circuits 33 is same as the number of the light sources 31. In the light irradiating part 30, the light source 31 and the light source driving circuit 33 are connected one to one. Thus, driving of the light sources 31 can be controlled by manners different from each other. Note that, the number of the light source driving circuits 33 may be smaller than the number of the light sources 31. In such case, the light sources 31 included in the same light source row may be connected to the same light source circuit 33. Based on such configuration, the light sources 31 may be controlled light source row by light source row basis.

Figure 7A:
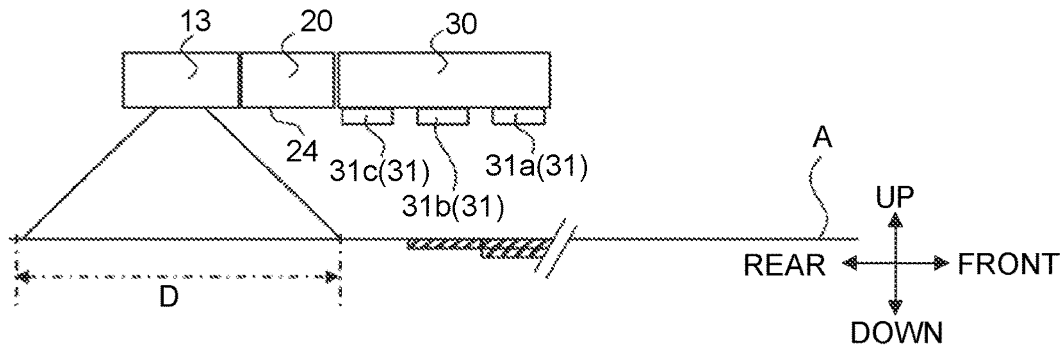
FIG. 7A is a view depicting a situation in which a discharging distance of a printing medium is measured by a sensor. Each of FIGS. 7B to 7D is a view depicting a situation in which a light irradiating part irradiates a printing medium with a light.

In an example depicted in FIG. 7A, a plurality of (for example, three pieces of) light sources 31 are arranged in the front-rear direction. For example, first light source 31*a*, second light source 31*b*, and third light source 31*c* are arranged in this order, from the front. The third light source 31*c* is the closest to the sensor 13 among the light sources 31. In the light irradiating part 30, the light sources 31 of the first light source 31*a*, the second light source 31*b*, and the third light source 31*c* are arranged in the left-right direction so as to construct rows. In each light source row, the light sources 31 are arranged such that light irradiating ranges of two adjacent light sources 31 are adjacent to or partly overlapped in the left-right direction.

In the printing processing, as depicted in FIGS. 7A to 7D, the controller 50 cause the line head 20 to discharge the ink based on the image data while conveying the printing medium A frontward, and causes the light irradiating part 30 to execute the irradiating operation of the light and cause the sensor 13 to execute the measuring operation of the discharge distance at timings different from each other. For example, the controller 50 sets one cycle including one measuring operation and three irradiating operations, and cause the light irradiating part 30 and the sensor 13 to execute the cycle repeatedly. As depicted in FIG. 7A. the controller 50 causes the sensor 13 to perform exposure (that is, to execute the measuring operation), in a state that the light irradiating part 30 is switched off (that is, the light sources 31 are switched off). Thus, the sensor 13 receives a shape data of the printing medium A optically, without receiving the light emitted from the light irradiating part 30 and reflected by the printing medium A, and consequently the discharging distance with respect to the printing medium A can be measured with high accuracy.

Figure 7B:
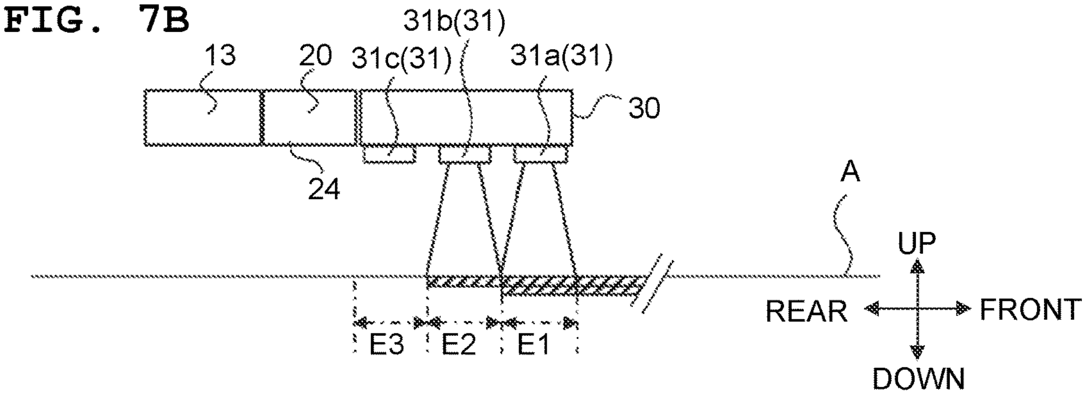

Then, as depicted in FIG. 7B, the controller 50 switches on the first light source 31*a* and the second light source 31*b* other than the third light source 31*c*, in a state that the sensor 13 is not caused to perform the exposure and the third light source 31*c* closest to the sensor 13 is switched off. Thus, a cycle irradiating range E1 of the printing medium A is irradiated with the light from the light source 31*a* and a cycle irradiating range E2 of the printing medium A is irradiated with the light from the light source 31*b*. The cycle irradiating range E1 and the cycle irradiating range E2 are adjacent to or partly overlapped with each other in the front-rear direction.

Figure 7C:
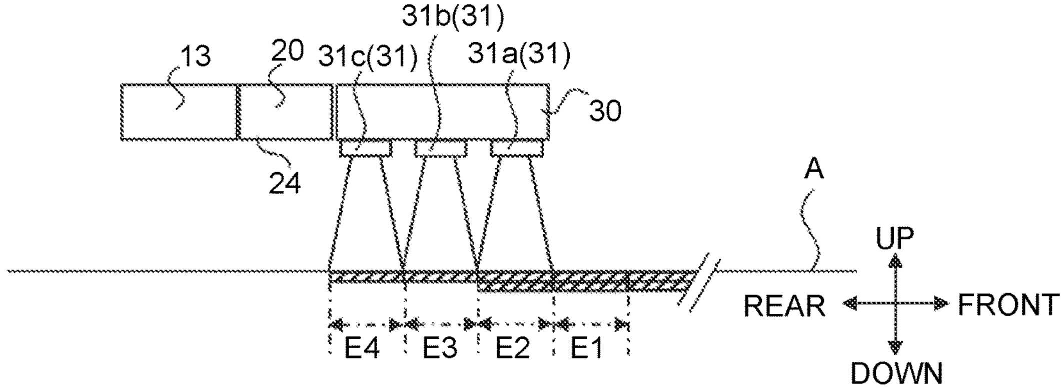

Then, as depicted in FIG. 7C, the controller 50 switches on all the light sources 31 of the first light source 31*a*, the second light source 31*b* and the third light source 31*c*, without causing the sensor 13 to perform the exposure. Thus, in the printing medium A moved frontward, the cycle irradiating range E2 is irradiated with the light from the first light source 31*a*, the cycle irradiating range E3 is irradiated with the light from the second light source 31*b*, and a cycle irradiating range E4 is irradiated with the light from the third light source 31*c*. The cycle irradiating range E3 and the cycle irradiating range E2 are adjacent to or partly overlapped with each other in the front-rear direction, and the cycle irradiating range E4 and the cycle irradiating range E3 are adjacent to or partly overlapped with each other in the front-rear direction.

Figure 7D:
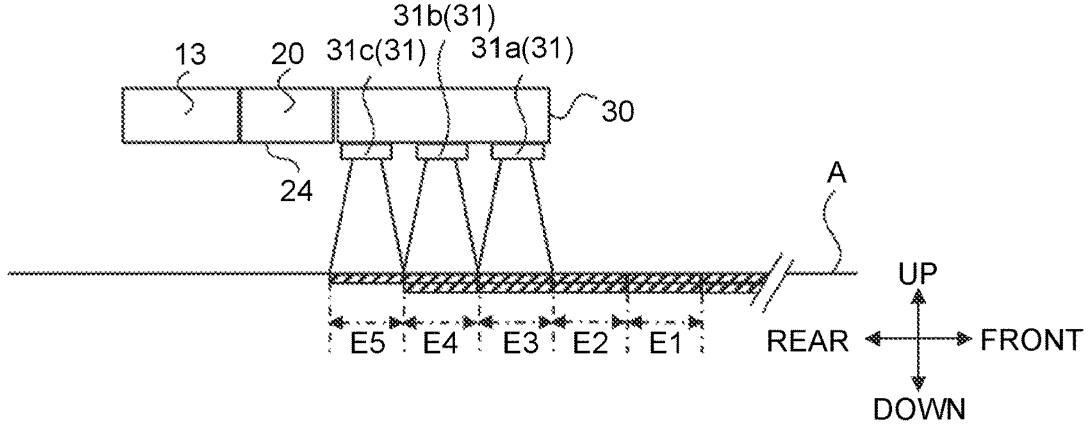

Further, as depicted in FIG. 7D, the controller 50 switches on all the light sources 31 of the first light source 31*a*, the second light source 31*b* and the third light source 31*c*, without causing the sensor 13 to perform the exposure. Thus, in the printing medium A moved frontward, the cycle irradiating range E3 is irradiated with the light from the first light source 31*a*, the cycle irradiating range E4 is irradiated with the light from the second light source 31*b*, and a cycle irradiating range E5 is irradiated with the light from the third light source 31*c*. The cycle irradiating range E5 and the cycle irradiating range E4 are adjacent to or partly overlapped with each other in the front-rear direction.

The controller 50 such as described above sets one cycle including the measuring operation by the sensor 13 depicted in FIG. 7A and the light irradiating operation by the light irradiating part 30 depicted in FIGS. 7B to 7D, and repeats the cycle. The cycle measuring range D of the measuring operation of the current cycle and the cycle measuring range D of the measuring operation of the next cycle are adjacent to or partly overlapped with each other in the front-rear direction. Thus, the discharging distance to the printing medium A can be measured without gap (clearance) throughout continuous cycles.

Each range on the printing medium A receives the light corresponding to the total light amount of two times of irradiating operations. Thus, the amount of the variation of the total light amount of the light from the light irradiating part 30 with which each range on the printing medium A is irradiated will be not more than the predetermined amount over the each range on the printing medium A. The total light amount is, for example, the product [$mJ/cm^2$] of illuminance [$mW/cm^2$] of the light times the duration of irradiating [s]. The duration of irradiating is predetermined based on the conveying velocity of the printing medium A. As described above, because the ink on the printing medium A is cured by receiving the light of which the total light amount has no variation or small variation, variation in curing state of the ink is reduced, and consequently deterioration of image quality due to curing state can be reduced.

In one cycle, the number of times of the irradiating operation by the light irradiating part 30 is larger than the number of times of the measuring operation by the sensor 13. Thus, the time period for data processing of the sensor 13 performed in a period in which the irradiating operation is performed can be made longer. Therefore, it is possible to correct, in the data processing, a shape data of the printing medium A measured in the measuring operation, and consequently measurement accuracy of the discharging distance can be improved.

Note that all embodiments described above may be combined with each other unless the embodiments contradict each other. Many improvements and other embodiments are clear to one of ordinary skills in the art in view of the above description. Thus, the above description should be interpreted as examples, and the above description is provided in order to teach one of ordinary skills in the art the best mode for executing the disclosure. Details of the structures and/or the functions can be substantially modified without deviating from the spirit of the disclosure.

The printing apparatus of the above embodiments is useful as a printing apparatus, etc. capable of reducing deterioration of measurement accuracy of a distance due to a reflected light, while suppressing upsizing.

What is claimed is:

1. A printing apparatus comprising:

a line head including a plurality of nozzles and a discharging surface in which the plurality of nozzles is opened, the line head being configured to discharge a photo-curing ink from the plurality of nozzles to a printing medium;

a light irradiator configured to irradiate the photo-curing ink on the printing medium with a light;

an optical sensor configured to measure a distance between the printing medium and the discharging surface, and a controller configured to cause the light irradiator to execute an irradiating operation of irradiating the photo-curing ink on the printing medium with the light at a first timing, and cause the optical sensor to execute a distance measuring operation of measuring the distance between the printing medium and the discharging surface at a second timing different from the first timing.

2. The printing apparatus according to claim 1, wherein the plurality of nozzles is arranged over a range not narrower than a printing area of the printing medium.

3. The printing apparatus according to claim 1, wherein a distance measurable range, on the printing medium, of the measuring operation by the sensor is wider than a light irradiable range, on the printing medium, of the irradiating operation by the light irradiator.

4. The printing apparatus according to claim 1, wherein:

the controller is configured to cause the light irradiator and the optical sensor to execute the irradiating operation and the measuring operation alternately and periodically; and duration of the irradiating by the irradiating operation in one cycle is longer than duration of the measuring of the distance between the printing medium and the discharging surface by the measuring operation in one cycle.

5. The printing apparatus according to claim 4, wherein the duration of the irradiating by the irradiating operation in one cycle is not less than five times longer than the duration of the measuring of the distance by the measuring operation in one cycle.

6. The printing apparatus according to claim 1, further comprising a conveyor configured to convey the printing medium in a first direction, wherein a measurable range in the first direction, on the printing medium, of the measuring operation by the optical sensor is wider than an irradiable range in the first direction, on the printing medium, of the irradiating operation by the light irradiator.

7. The printing apparatus according to claim 6, wherein:

the controller is configured to cause the light irradiator and the optical sensor to execute the irradiating operation and the measuring operation alternately and periodically; and duration of the irradiating by the irradiating operation in one cycle is longer than duration of the measuring of the distance by the measuring operation in one cycle.

8. The printing apparatus according to claim 6, wherein the line head is interposed between the optical sensor and the light irradiator in the first direction.

9. The printing apparatus according to claim 1, wherein:

the optical sensor includes a light emitter configured to emit a measuring light and a light receiver configured to receive the measuring light reflected by the printing medium; and the controller is configured to cause the light irradiator to stop the executing of the irradiating operation during a period in which the light emitter emits the measuring light.

10. The printing apparatus according to claim 1, wherein the light irradiator includes a plurality of light sources, and a plurality of driving circuits configured to drive the plurality of light sources respectively.

11. The printing apparatus according to claim 10 further comprising a conveyor configured to convey the printing medium in a first direction, wherein the controller is configured to switch on and switch off the plurality of light sources arranged in the first direction such that an amount of variation of a total light amount of the light, from the light irradiator, with which at least a part on the printing medium is irradiated is not more than a predetermined amount over the at least the part on the printing medium.

12. The printing apparatus according to claim 11, wherein the controller is configured to switch on and switch off the plurality of light sources arranged in the first direction such that an amount of variation of a total light amount of the light, from the light irradiator, with which each part on the printing medium is irradiated is not more than a predetermined amount over the each part on the printing medium.

13. The printing apparatus according to claim 1, wherein the optical sensor is a three-dimensional canner.

14. The printing apparatus according to claim 1, further comprising a casing accommodating the line head, the light irradiator, and the optical sensor.

15. A method for controlling a printing apparatus:

the printing apparatus including:

a line head including a plurality of nozzles and a discharging surface in which the plurality of nozzles is opened, the line head being configured to discharge a photo-curing ink from the plurality of nozzles to a printing medium;

a light irradiator configured to irradiate the photo-curing ink on the printing medium with a light; and an optical sensor configured to measure a distance between the printing medium and the discharging surface, the method comprising:

causing the light irradiator to execute an irradiating operation of irradiating the photo-curing ink on the printing medium with the light at a first timing; and causing the optical sensor to execute a distance measuring operation of measuring the distance between the printing medium and the discharging surface, at a second timing different from the first timing.

16. A non-transitory and computer-readable medium storing a program which is executable by a controller of a printing apparatus:

the printing apparatus including:

a line head including a plurality of nozzles and a discharging surface in which the plurality of nozzles is opened, the line head being configured to discharge a photo-curing ink from the plurality of nozzles to a printing medium;

a light irradiator configured to irradiate the photo-curing ink on the printing medium with a light;

an optical sensor configured to measure a distance between the printing medium and the discharging surface, and a controller, the program is configured to cause the controller to:

cause the light irradiator to execute an irradiating operation of irradiating the photo-curing ink on the printing medium with the light at a first timing; and cause the optical sensor to execute a distance measuring operation of measuring the distance between the printing medium and the discharging surface, at a second timing different from the first timing.

* * * * *